March 24, 1925.　　　　　　　　　　　　　　　　　1,530,808
D. R. BOWEN ET AL
MACHINE FOR MIXING OR MASTICATING RUBBER AND LIKE MATERIAL
Original Filed Sept. 14, 1917　　3 Sheets-Sheet 1
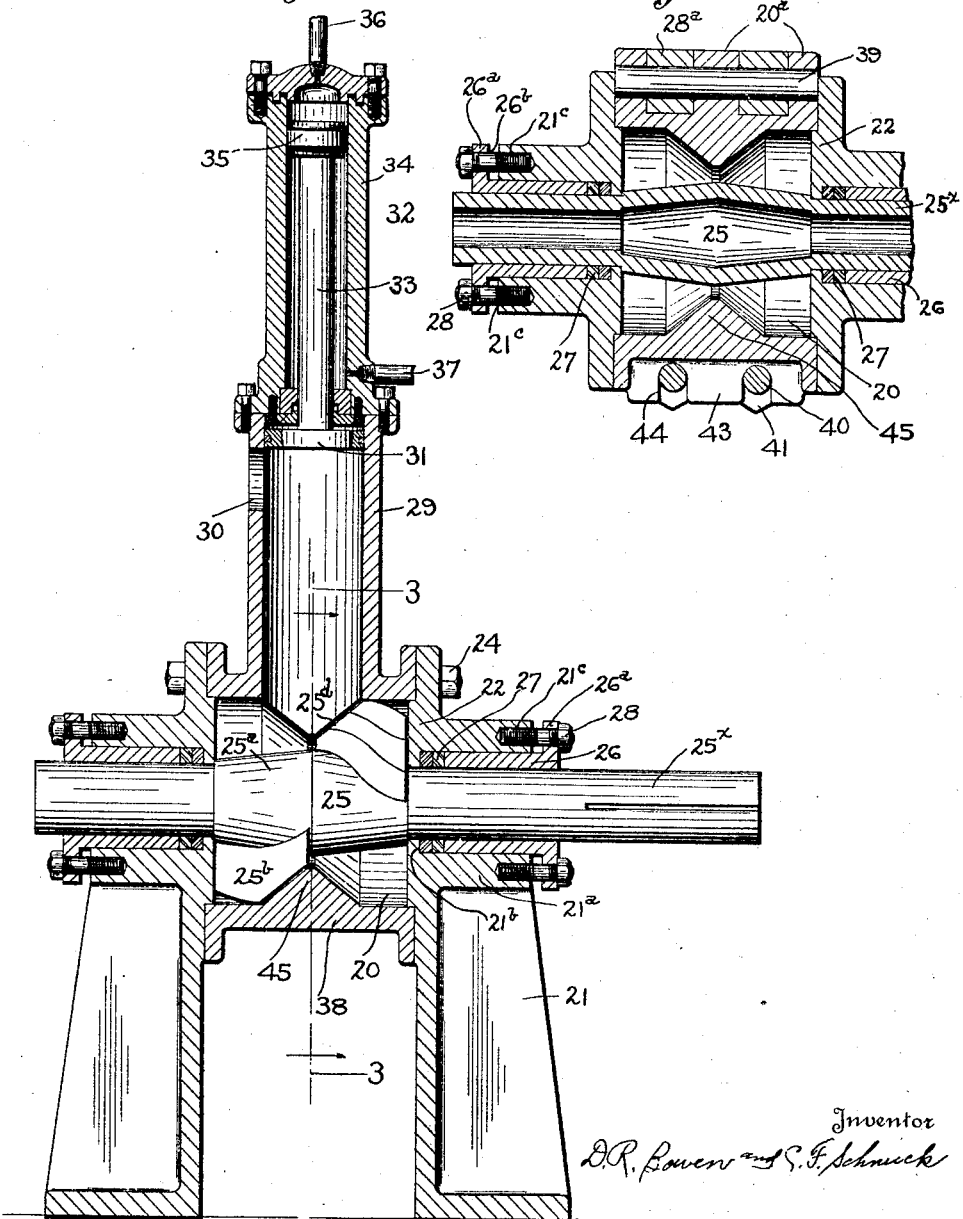

March 24, 1925.
D. R. BOWEN ET AL
1,530,808
MACHINE FOR MIXING OR MASTICATING RUBBER AND LIKE MATERIAL
Original Filed Sept. 14, 1917   3 Sheets-Sheet 2
Fig. 3.
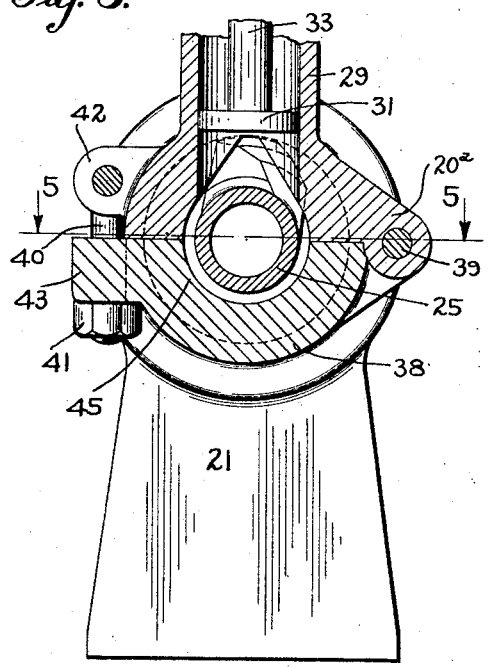
Fig. 2.
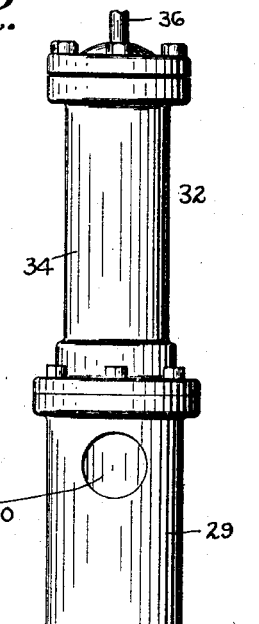
Fig. 4.
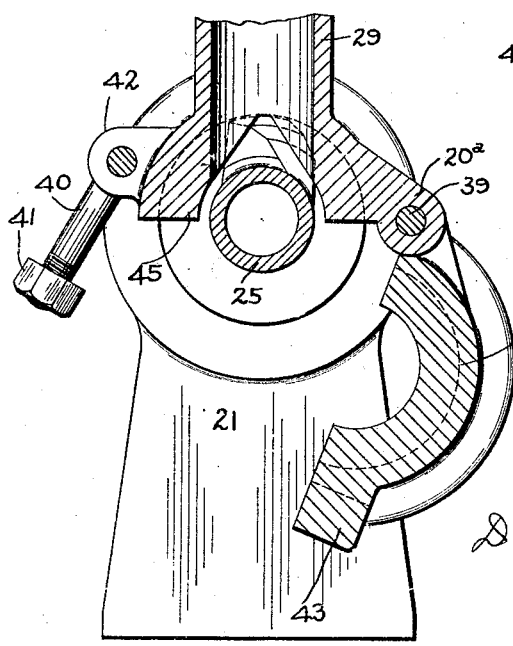
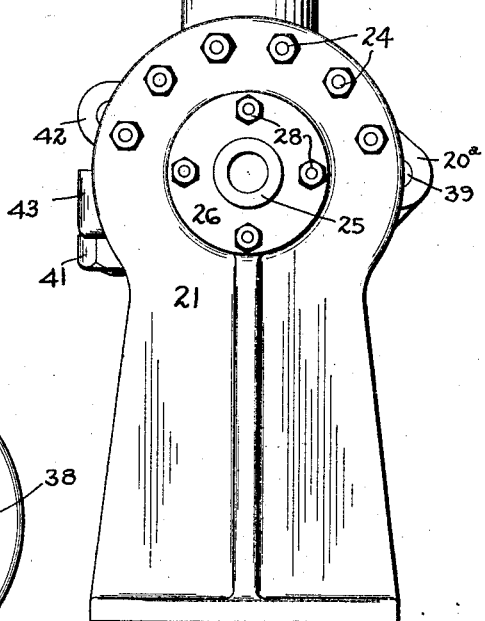
Inventor
D. R. Bowen and C. F. Schnuck
By Henry E. Rockwell
Attorney March 24, 1925.
D. R. BOWEN ET AL
1,530,808
MACHINE FOR MIXING OR MASTICATING RUBBER AND LIKE MATERIAL
Original Filed Sept. 14, 1917  3 Sheets-Sheet 3
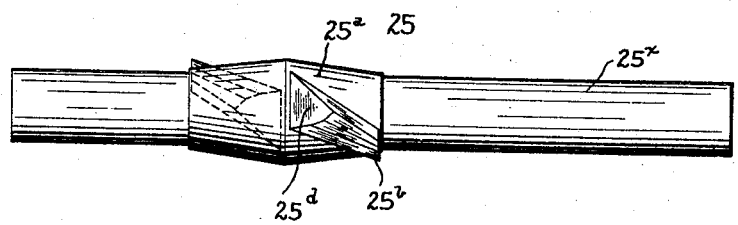
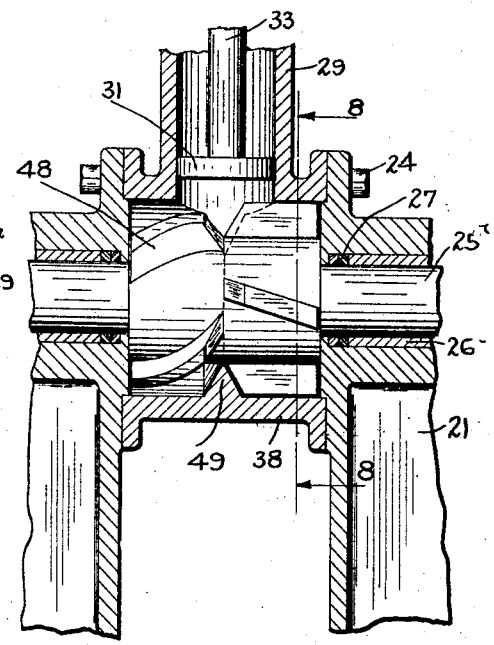
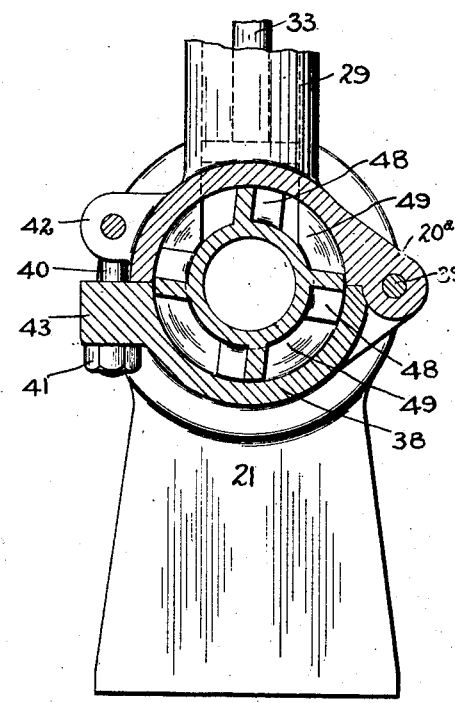

Patented Mar. 24, 1925.

1,530,808

UNITED STATES PATENT OFFICE.

DAVID REES BOWEN AND CARL F. SCHNUCK, BOTH OF ANSONIA, CONNECTICUT, ASSIGNORS TO FARREL FOUNDRY & MACHINE COMPANY, OF ANSONIA, CONNECTICUT.

MACHINE FOR MIXING OR MASTICATING RUBBER AND LIKE MATERIAL.

Original application filed September 14, 1917, Serial No. 191,413. Divided and this application filed November 11, 1920, Serial No. 423,365. Renewed August 29, 1924.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Machines for Mixing or Masticating Rubber and Like Material, of which the following is a full, clear, and exact description.

This invention relates to machines for treating rubber and similar material, and it has particular reference to machines for masticating, working, kneading or mixing rubber which is to be used for various industrial purposes, such as the one shown in our application Serial No. 191,413, filed September 14, 1917, of which this application is a division.

One of the primary objects of our invention is the provision of a machine of the character indicated in which the working or kneading action is extremely thorough and efficient.

Another object of our invention is to furnish a masticator or similar machine which will break up the rubber or other material and reduce it in a comparatively short time to a smooth, homogeneous mass.

The invention also has in view the provision of a very efficient single cylinder machine; the production of an improved form of mixing chamber or cylinder and an improved form of rotor; a considerable improvement in the method of constructing the rotor bearings; the provision of an efficient and simple form of cylinder or chamber closure which can be readily opened for the rapid and thorough discharge of the contents of the mixing chamber; and the general improvement in construction and operation of devices of the class to which the invention relates.

To these and other ends, the invention consists in the novel features, parts and combinations of parts to be hereinafter described and claimed.

Reference is to be had to the accompanying drawings forming part of the specification, wherein—

Fig. 1 is a vertical longitudinal section of the mixer embodying our improvements showing the mixing chamber closed and the pressure plunger in raised position;

Fig. 2 is an end elevation of the rubber mixer shown in Fig. 1;

Fig. 3 is a sectional view on line 3—3 of Fig. 1, but showing the pressure plunger in its lowered position;

Fig. 4 is a sectional view of the mixing chamber showing the lower section of the same in discharging position;

Fig. 5 is a sectional view on line 5—5 of Fig. 3;

Fig. 6 is a detail side elevation of the rotor;

Fig. 7 illustrates a modified form of the mixing chamber and rotor construction; and Fig. 8 is a sectional view on line 8—8 of Fig. 7.

In the particular machine selected for illustration in the present application, the structure is characterized by a generally cylindrical mixing chamber which is adapted to be supported above the floor level and in which there is journalled a single, approximately central mixing element or rotor adapted to be driven by power applied to the rotor shaft. This machine is intended to be charged at the top and discharged at the bottom, for which purpose the mixing chamber is provided at its upper portion with a stack or chute into which the material to be treated is charged, said stack or chute being provided interiorly with a fluid pressure operated plunger or ram for forcing the material down into the mixing chamber against the rotor, while the lower part of the mixing chamber is movably mounted to permit the discharge of the mixed material when the operation has been completed. Many of these features, however, are susceptible of very considerable modification without departing from the scope of our invention, which concerns itself chiefly in its primary aspect with the form of the mixing chamber and rotor and the manner in which said parts cooperate.

In the example illustrated, a mixing chamber 20 of generally cylindrical shape is mounted between suitable standards, pedestals or end frames 21, having heads 22 which close the cylinder at the respective ends. The end frames and the body portion of the cylinder may be conveniently interconnected by bolts 24. A rotary mixing element or rotor 25 is provided within the mixing chamber in a substantially central location, said rotor having a horizontal shaft 25$^x$ with bearings in the respective end frames, that portion of the shaft within the cylinder being provided with one or more blades for masticating or kneading the material, as hereinafter described.

Stuffing boxes are provided for the rotor shaft in a convenient and satisfactory manner by forming bearing sleeves or boxes 21$^a$ in the end frames 21, opposite the center of the heads 22, and the bearings for the rotor shaft may be conveninetly formed in adjustable stuffing box glands 26, of brass or other suitable bearing metal, snugly fitted into these bearing sleeves. Adjacent the chamber the hollow portions of the sleeves 21$^a$ are reduced in size by the provision of annular shoulders 21$^b$ and rings 27 of suitable packing or the like are adapted to fit around the shaft and be compressed against the shoulders by the adjustable glands. The edges of the sleeves are provided with studs 21$^c$ which are adapted to be received in opening 26$^b$ in annular flanges 26$^a$ formed on the outer ends of the glands 26. It will be apparent that by tighening the nuts 28, threaded on the studs 21$^c$, the glands 26 may be adjusted to the desired position. These stuffing boxes are admirably adapted not only to prevent the escape from the cylinder of the material under treatment therein, but also to prevent any foreign matter such as oil, dust or the like from working its way into the chamber around the rotor shaft.

At the upper portion of the mixing chamber, the same is provided with an upright stack, chute or chimney 29, which may be conveniently cast integral with the main body portion of the cylinder. Near the upper end of the stack or chute is a charging opening 30 through which material to be treated is introduced, and operating in the stack is a charging device in the form of a pressure plunger 31, movable up and down by a fluid pressure cylinder and piston device 32, supported on top of the stack. The plunger 31 has a rod 33 extending upward into the cylinder 34, and on the rod 33 is a piston 35. In the particular example shown, the plunger 31 is hydraulically operated, for which purpose a water connection 36 is provided at the top of the cylinder 34 above piston 35, while a second water connection 37 is provided at the lower part of the cylinder. The connections 36, 37 are controlled by valves in an obvious manner, so as to produce the upward and downward movement of the pressure plunger 31 in a manner which is well understood in the art.

When the material to be treated has been introduced into the mixing chamber through the opening in the stack, the pressure plunger 31 is forced down so as to push the mass forcibly into the mixing chamber, and hold it in contact with the rotating blade or blades therein, whereby such material is effectively acted upon by such blade or blades. When the mixing or masticating operation has been completed, the machine is discharged by moving the lower part of the mixing chamber relatively to the upper part in such a manner that an opening is presented for the discharge of the material, usually in a downward direction. For this purpose the machine shown in the drawing has the entire lower portion 38 of the chamber 20 arranged so that it can be moved downward to open the lower part of the machine, and the movable wall portion 38 of the chamber is preferably hinged at one side of the chamber, as shown at 39, so that it can swing downward into the discharging position shown in Fig. 4. In the particular example illustrated, the lower movable section 38 comprises approximately half of the main mixing chamber wall, said mixing chamber being divided longitudinally and diametrically, but, of course, this is not essential in all cases. Furthermore, the method of hinging the movable section 38 and the means for locking it in place may vary considerably as called for by different conditions. In the case under discussion, the hinge connection 39 consists of a pintle which passes through alternately arranged knuckles on the main body of the chamber wall and on the movable part 38. In Fig. 5, it will be observed that the knuckles of the main or body portion of the chamber wall are indicated at 20$^a$, while the knuckles of part 38 are designated 38$^a$. At the opposite side of the mixing chamber, swinging locking bolts 40 having nuts 41 are pivoted to lugs 42 on the body portion of the chamber, so as to hang down therefrom, and the nuts 41 are adapted to engage the under surface of a lateral slotted lug or flange 43 at the free edge of the hinged section 38 to clamp the two sections of the casing or chamber together. The lug 43 is provided with slots 44 into which the bolts 40 are adapted to swing, as shown more particularly in Fig. 5. By screwing up the nuts 41, the machined meeting edges of the casing or chamber sections may be forced into tight contact to prevent effectively the escape of any of the treated material at the joint between the sections.

In the example shown in Fig. 1 the rotor is provided within the mixing chamber with an enlargement or hub 25$^a$, on which two blades 25$^b$ are provided, one of said blades being located in one end of the mixing chamber and the other in the opposite end.

These blades, moreover, are located approximately diametrically with respect to the shaft axis, as shown, for example, in Fig. 6. In this particular example each blade extends approximately throughout one half of the mixing chamber length, and both blades cooperate with a transverse rib or ridge 45 on the chamber wall, located intermediate of the ends of the chamber. As illustrated, this rib is continuous except for the interruption at the upper part where the stack 29 communicates with the upper part of the chamber and the blades 25ᵇ are so shaped as to cooperate with the rib 45 in producing an extrusion of the rubber from one end of the chamber to the other and back again.

During the working operation, the material is held against the rotor by the pressure plunger or follower 31, and the temperature of the material can be controlled to a certain extent by means of water, steam or other fluid introduced into the mixing chamber wall and the interior of the rotor, which may be made hollow for this purpose. In the present case, we have shown a hollow rotor but we have not considered it necessary to illustrate a jacketed chamber as this in itself is a well-known feature.

The mixing or masticating operation having been completed, the machine is discharged by opening the lower part of the mixing chamber, as shown in Fig. 4. The rotation of the rotor is continued until all of the material has been stripped off of the same. In this operation, the main or body portion of the mixing chamber acts in the nature of a stripper, that portion of the rib carried by said body portion being especially effective in this regard. When all of the treated material has been stripped off and discharged, the mixing chamber is again closed, and the pressure plunger is raised preliminary to operation on another batch of material.

In the particular form shown in Fig. 1, the rotor hub is enlarged at the middle portion, being formed, in effect of two cone frustums with their bases together. The blades 25ᵇ are bevelled off at their inner portions to conform to the rib, as shown at 25ᵈ, and their inner ends are located closely adjacent the center of the hub and the center of the rib, so as to press the material forcibly through the narrow, annular extrusion opening which is provided at that point, in a direction which is generally lengthwise of the chamber. The outer end portions of the blades are of the full depth, so that their outer edges rotate in close proximity to the cylindrical wall of the chamber, while the edges at the extreme outer ends of the blades rotate in close proximity to the end walls of the chamber. By this construction, the material is effectively smeared or scraped along the walls of the chamber and carried lengthwise of the chamber from one end to the other without the formation of any pockets in which inert material can collect.

The path of movement taken by the material during the mixing operation will be clear from an inspection of Fig. 1. It will be apparent that while one blade is forcing and wedging the material against one side face of the rib, and thereby extruding it through the constricted portion of the chamber, the other blade is doing the same thing at the other side face of the rib or other constriction, although, in the example shown, this occurs at a diametrically opposite point. The mixing chamber can be said to consist of two end portions or sections created by constriction of the intermediate part of the chamber, there being an operating blade in each chamber section, which, by rotation therein, forces the material into the other section, whereby an alternate movement of the material from one section to the other by way of the constricted portion is obtained as long as the blades are rotated.

In the broad aspects of our invention, we do not limit ourselves to any particular form of transverse rib or constriction, nor to any particular number or disposition of the blades so long as the general operation hereinbefore described is obtained. In the form shown in Figs. 7 and 8, for example, four blades 48 are used at each end of the rotor, i. e. in each compartment of the mixing chamber. This arrangement is particularly intended for a mixer of large capacity, and the number of blades can be still further increased if desired. In this particular embodiment a sharply defined intermediate rib or abutment 49 of V-shaped cross-section is employed. In a machine of this type, the blades of the two series corresponding to the respective compartments or divisions of the chamber are arranged in staggered relation, as shown in Fig. 7 to obtain the alternate movement of the material from one chamber compartment to the other. However, this feature and others may be considerably varied without departure from the scope of the invention as defined in the claims.

It will be understood, of course, that while our improvements are shown in connection with a mixing chamber provided with a rib to cause an extrusion of the material therein, we do not limit ourselves to such a chamber, as in some aspects of the invention it is not essential that the mixing chamber be provided with a rib. It will be further understood that while we have chosen to illustrate our invention as applied to a rubber mixer provided with one chamber, the invention is not to be limited necessarily to a machine of the single cylinder type, as it may be applied to similar devices having a plurality of chambers.

We do not claim herein a rubber working machine having a working chamber in the form of a single substantially complete cylinder, and a rotor having blades for working the material back and forth and around the inner cylinder surface by a smearing action, said cylinder confining the rotor on all sides so as to utilize substantially the entire inner cylindrical surface for mastication, as claimed in our application Serial No. 458,222, filed April 4, 1921.

What we claim is:

1. In a machine of the character described, a chamber, a rotor therein, a rotor shaft for the rotor having an end projecting through the chamber wall, and a stuffing box for the projecting end of said shaft provided with packing for preventing the escape of material around the shaft and with a member for compressing said packing, said member constituting the main rotor bearing.

2. A rubber treating machine comprising a mixing chamber having end walls, said walls being formed with extended bearing sleeves, a rotor having blades for smearing the material against the inner periphery of the chamber, a rotor shaft rotatably mounted in said sleeves, and combined rotor bearing and packing glands fitted between said shaft and said sleeves, said glands constituting the main rotor bearings.

3. A rubber treating machine comprising a mixing chamber having end walls, one of said walls being formed with an extended bearing sleeve, a rotor having blades for smearing the material against the inner periphery of the chamber, a rotor shaft rotatably mounted in said sleeve, an adjustable shaft bearing gland constituting the major part of the shaft end bearing fitted between said shaft and sleeve and packing material between the gland and sleeve and maintained under compression by the gland.

4. A rubber treating machine comprising a chamber having end walls, an outwardly directed bearing sleeve on one of said end walls provided with an inner annular shoulder, a rotor bearing gland in said sleeve, a rotor shaft rotatably mounted in said gland and having its main bearing therein and a packing ring about said shaft compressed against said shoulder by said bearing gland.

5. A rubber treating machine having a rotor shaft, a bearing sleeve in which said shaft is mounted provided with an annular shoulder, a rotor bearing gland having an extended bearing surface in said sleeve and a packing ring about said shaft and positioned between the shoulder and gland.

6. A rubber treating machine having a rotor shaft, a bearing sleeve, in which said shaft is mounted, provided with an annular shoulder, a packing ring about said shaft and a bearing gland providing an extended bearing surface for said shaft and compressing said packing against said shoulder.

7. A rubber treating machine having a working chamber, pedestals supporting the chamber and provided with extensions forming the end walls thereof, a rotor shaft, a bearing sleeve on one of the end walls of the chamber in which said shaft is mounted, provided with an annular shoulder, a packing ring about said shaft, and a main rotor bearing member mounted in said sleeve and adjustable therein to compress the packing ring against said shoulder.

8. A rubber treating machine having a working chamber, pedestals supporting the chamber and provided with integral extensions forming the end walls thereof, a rotor shaft passing through the chamber and a stuffing box formed upon each end wall of the chamber and having an adjustable packing compressing member serving as the main rotor bearing.

9. A rubber treating machine comprising a mixing chamber having end walls formed with outwardly extending elongated sleeves, a rotor, a rotor shaft extending through said sleeves, bearing glands in said sleeves constituting the main rotor bearings, packing interposed between the inner ends of the sleeves and the end walls of the chamber, around the shaft, each gland having a flange at its outer end and headed screw threaded studs connecting each flange with the corresponding sleeve end whereby the packing may be maintained under compression.

10. In a rubber mixer, a working chamber having end openings, pedestals having integral heads closing said openings, stuffing boxes associated with said heads, a rotor shaft mounted in said stuffing boxes, packing surrounding said shaft and bearing glands in said boxes for compressing said packing and presenting extended bearing surfaces for the rotor shaft.

11. In a machine of the character described, a working chamber, pedestals supporting said chamber, said pedestals being provided with extensions forming the ends of said chamber, and hinged sections, supported between said ends, forming the sides of said chamber.

12. In a machine of the class described, a working chamber including two end walls and hinged sections supported between said end walls, and pedestals for supporting said chamber, said end walls being extensions of said pedestals.

13. In a machine of the class described, a cylindrical working chamber, pedestals for supporting said chamber, provided with extensions forming the ends of the chamber, the curved surface of said cylinder comprising hinged sections supported between said ends.

14. In a machine of the character described, a working cylinder open at the ends, heads applied to the ends of the cylinder and having supporting pedestals, a rotor journalled in the heads and having blades located in the cylinder, and a hinged discharge section at the lower part of the cylinder directly below the rotor interposed between the pedestals and extending from one of them to the other.

15. In a machine of the character described, a working chamber comprising two end walls and a cylinder supported therebetween and divided substantially diametrically in a lengthwise direction into two sections, one of said sections being rigidly connected to said end walls and having the other section hinged thereto.

16. In a machine of the character described, a working chamber comprising two end walls and a cylinder supported therebetween and divided into two sections, one of said sections being rigidly connected to said end walls and having a laterally extending hinge pin mounted thereon, and means for swingingly mounting the other section on said pin.

17. In a machine of the character described, a chamber to contain the material to be mixed, a bladed rotor in said chamber, there being a plurality of blades on each end of said rotor arranged in staggered relation to the blades on the other end thereof.

18. In a machine of the character described, a chamber to contain the material to be mixed, a bladed rotor in said chamber, there being a plurality of blades on each end of said rotor arranged in staggered relation to the blades on the other end thereof, and each blade urging said material from the chamber end toward an intermediate portion thereof.

19. In a machine of the character described, a chamber containing the materials to be mixed and having a constricted intermediate portion and a plurality of blades operating in each end of the chamber to force said material through the constricted portion of said chamber.

20. In a machine of the character described, a chamber, containing the materials to be mixed, a rotor therein, presenting, in conjunction with said chamber, a restricted extrusion space and a plurality of blades on the rotor in each end of the chamber to extrude the material through said space.

21. In a machine of the character described, a working chamber, a bladed rotor therein for working the material back and forth, said rotor having a plurality of blades in each end of the chamber for working the material against the inner chamber periphery.

In witness whereof, we have hereunto set our hands on the 6th day of November, 1920.

DAVID REES BOWEN.
CARL F. SCHNUCK.